United States Patent
McHugh et al.

(10) Patent No.: US 7,552,452 B2
(45) Date of Patent: *Jun. 23, 2009

(54) SAFE, SECURE RESOURCE EDITING FOR APPLICATION LOCALIZATION WITH LANGUAGE FALLBACK

(75) Inventors: Barry McHugh, Artane (IE); Jan-Roelof Falkena, Seattle, WA (US); Robert Grimes, Sandyford (IE); Terry Farrell, Mount Merrion (IE); David Ahs, Grand Canal Quay (IE); Alexei Soloveitchik, Dublin (IE)

(73) Assignee: Microsoft Corporation, Redmond, WA (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/040,331

(22) Filed: Jan. 20, 2005

(65) Prior Publication Data

US 2006/0130032 A1  Jun. 15, 2006

Related U.S. Application Data

(63) Continuation of application No. 11/002,773, filed on Dec. 1, 2004.

(51) Int. Cl.
  *G06F 3/00* (2006.01)
  *G06F 9/44* (2006.01)
  *G06F 9/46* (2006.01)
  *G06F 13/00* (2006.01)
  *G06F 9/445* (2006.01)
  *G06F 17/20* (2006.01)

(52) U.S. Cl. ............... 719/331; 719/328; 717/168; 717/174; 704/1

(58) Field of Classification Search ............... 719/320, 719/328, 331–332; 717/168–178; 704/1, 704/10; 726/1–2; 707/9
See application file for complete search history.

(56) References Cited

U.S. PATENT DOCUMENTS 4,649,480 A  3/1987 Ohki et al.

(Continued)

OTHER PUBLICATIONS

"Detours: Binary Interception of Win32 Functions," by Glaen Hunt & Doug Brubacher, Proceedings of the 3$^{rd}$ USENIX Windows NT Symposium, Seattle, Washington, Jul. 1999, pp. 1-9.

(Continued)

*Primary Examiner*—Meng-Ai An
*Assistant Examiner*—Qing-Yuan Wu
(74) *Attorney, Agent, or Firm*—Merchant & Gould, P.C.

(57) ABSTRACT

Embodiments of the present invention relate to methods, systems and computer-readable media for external localization of a software product. This external localization involves loading a base product having one or more calls to an operating system (or an API) to load language specific data. The calls are intercepted after the resource is loaded into a Resource loader, and queried whether the resource is identified in a restricted resource list such as a code signed dynamic linked library. If so, the translated resource is loaded from a specified language package. The loaded, and translated, resource is then checked against validation rules (which are also protected in a code signed resource list) to see if it is safe to use. If the resource is not on the list or the translated resource is not safe to use, the original resource is simply transferred to the application without modification from the resource loader, i.e., loaded from the base language file. This generates a localized product using a limited set of language specific data covering most situations and falls back to the base language automatically when no specific translated resource is available.

10 Claims, 3 Drawing Sheets

U.S. PATENT DOCUMENTS

| | | | |
|---|---|---|---|
| 5,450,538 | A | 9/1995 | Glaser et al. |
| 5,664,206 | A * | 9/1997 | Murow et al. ............... 704/8 |
| 5,671,378 | A | 9/1997 | Acker et al. |
| 5,872,973 | A | 2/1999 | Mitchell et al. |
| 5,886,694 | A | 3/1999 | Breinberg et al. |
| 6,035,121 | A | 3/2000 | Chiu et al. |
| 6,041,180 | A | 3/2000 | Perks et al. |
| 6,093,215 | A | 7/2000 | Buxton et al. |
| 6,195,794 | B1 | 2/2001 | Buxton |
| 6,275,790 | B1 | 8/2001 | Yamamoto et al. |
| 6,275,978 | B1 | 8/2001 | Bell |
| 6,392,673 | B1 | 5/2002 | Andrew et al. |
| 6,467,085 | B2 | 10/2002 | Larsson |
| 6,469,713 | B2 | 10/2002 | Hetherington et al. |
| 6,496,793 | B1 | 12/2002 | Veditz et al. ............... 704/8 |
| 6,513,025 | B1 | 1/2003 | Rosen |
| 6,530,039 | B1 | 3/2003 | Yang |
| 6,557,165 | B1 | 4/2003 | Nagashima et al. |
| 6,658,644 | B1 | 12/2003 | Bishop et al. |
| 6,662,355 | B1 | 12/2003 | Caswell et al. |
| 6,691,298 | B1 | 2/2004 | Russo et al. |
| 6,718,549 | B1 | 4/2004 | Narin et al. |
| 6,744,450 | B1 | 6/2004 | Zimniewicz et al. |
| 6,766,348 | B1 * | 7/2004 | Combs et al. ............... 718/104 |
| 6,820,267 | B2 * | 11/2004 | Christensen et al. ......... 719/315 |
| 6,859,820 | B1 * | 2/2005 | Hauduc et al. ............... 709/203 |
| 6,877,154 | B2 | 4/2005 | Nagashima et al. |
| 6,931,628 | B2 | 8/2005 | McGeorge, Jr. |
| 6,950,993 | B2 | 9/2005 | Breinberg |
| 6,968,438 | B1 | 11/2005 | Russo et al. |
| 7,017,143 | B1 * | 3/2006 | Andrew et al. ............... 717/100 |
| 7,111,282 | B2 | 9/2006 | Stephenson |
| 7,152,222 | B2 | 12/2006 | Kumhyr et al. |
| 7,222,343 | B2 | 5/2007 | Heyrman et al. |
| 7,228,541 | B2 | 6/2007 | Gupton et al. |
| 7,318,020 | B1 | 1/2008 | Kim |
| 7,337,079 | B2 | 2/2008 | Park et al. |
| 2003/0025737 | A1 | 2/2003 | Breinberg |
| 2003/0101043 | A1 | 5/2003 | Boegelund et al. |
| 2003/0126559 | A1 | 7/2003 | Fuhrmann ............... 715/513 |
| 2004/0122652 | A1 | 6/2004 | Andrews et al. ............... 704/2 |
| 2004/0167784 | A1 | 8/2004 | Travieso et al. ............ 704/270.1 |
| 2004/0230416 | A1 * | 11/2004 | Ye et al. ............... 704/5 |
| 2005/0050526 | A1 | 3/2005 | Dahne-Steuber et al. |
| 2005/0066315 | A1 | 3/2005 | Nguyen et al. |
| 2005/0102253 | A1 * | 5/2005 | Wu et al. ............... 707/1 |
| 2005/0188383 | A1 * | 8/2005 | Alcazar et al. ............... 719/331 |
| 2006/0059424 | A1 | 3/2006 | Petri et al. |
| 2006/0080082 | A1 | 4/2006 | Ravindra et al. |
| 2006/0116864 | A1 | 6/2006 | McHugh et al. |
| 2006/0130026 | A1 | 6/2006 | McHugh et al. |
| 2006/0130031 | A1 | 6/2006 | McHugh et al. |
| 2006/0150173 | A1 | 7/2006 | McHugh et al. |
| 2006/0206797 | A1 | 9/2006 | Kohlmeier et al. |
| 2007/0150258 | A1 | 6/2007 | Lister et al. |
| 2007/0226687 | A1 | 9/2007 | Fallen-Bailey et al. |

OTHER PUBLICATIONS

"Vectored Exception Handling in Windows Server 2003," http://www.devx.com/SummitDays/Article/15992/1411/pdo/B9440BEA0C53FEBCB807C22A051841D.

Office Action, Feb. 21, 2008, Issued in U.S. Appl. No. 11/042,470.

Office Action, Sep. 24, 2008, Issued in U.S. Appl. No. 11/042,470.

Office Action, Sep. 25, 2007, Issued in U.S. Appl. No. 11/042,806.

Final Office Action, Apr. 14, 2008, Issued in U.S. Appl. No. 11/042,806.

Office Action, Mar. 18, 2008, Issued in U.S. Appl. No. 11/002,773.

Office Action, Nov. 28, 2007, Issued in U.S. Appl. No. 11/040,330.

Office Action, Jun. 5, 2008, Issued in U.S. Appl. No. 11/040,330.

Forte Software, Building International Applications, 1995, Whole Manual.

Forte Programming Guide, Release 3, 1998, Chapter 15.

Annotated Bibliography of Internationalization and Localization, J.D. Becker, Scientific American, Jul. 1984, pp. 96-107.

Internationalization and Localization Using Microsoft.NET, Nick Symmonds, Jan. 2002, Chapters 2-3, 7, 9-11.

Final Office Action dated Oct. 30, 2008, Issued in U.S. Appl. No. 11/002,773.

Final Office Action dated Mar. 30, 2009 Issued in U.S. Appl. No. 11/042,470.

* cited by examiner

SAFE, SECURE RESOURCE EDITING FOR APPLICATION LOCALIZATION WITH LANGUAGE FALLBACK

CROSS-REFERENCE TO RELATED APPLICATIONS

This application is a divisional of U.S. patent application Ser. No. 11/002,773, filed Dec. 1, 2004, entitled Safe, Secure Resource Editing For Application Localization, the disclosure of which is incorporated herein by reference in its entirety.

TECHNICAL FIELD

The invention relates generally to the field of computer software products. More particularly, the invention relates to methods and systems for producing language specific versions of a software product.

BACKGROUND OF THE INVENTION

Software products of all types, whether operating systems or various types of application programs, are frequently provided in multiple "localized", language specific versions. For instance, a software product may initially be developed in a specific language such as English. Once this original, or "base" product has been developed and tested, localized versions, in a language appropriate to the market for which the product is intended, may be developed. For example, a product originally developed in English in the United States may be localized to produce a Japanese language version for sale in Japan. The process of creating a localized version, or translation, is herein referred to as "localization."

A common method of localization is known as internal localization. Internal localization typically involves changing the resources of the original software product to produce the localized version. For example, all of the elements of the user interface, messages, help information, and other language specific parts of the software product are translated and re-built. Since the resources of the software product are revised and rebuilt, testing is required for each internally localized version generated, in addition to the base product. The building of the dynamic link libraries (DLLs) correctly is a complex process for many applications, and the tools involved are often proprietary or secret. Since testing is labor intensive, this method can be extremely expensive. In addition to being expensive, internal localization, due to the long time required to test a software product, results in a very slow delivery of localized versions of software products. This is known as the multiple language user interface (MUI) approach where all of the resources for each language are grouped into resource files. These files are usually stored in a folder named after the language.

It is with respect to these needs that the present invention has been developed.

SUMMARY OF THE INVENTION

An embodiment of the present invention is a system and method for providing translation, or localization, of a software product that, after the application is loaded in its base language, transparently examines each call for a resource to be loaded from a multiple language user interface dynamic linked library (MUI DLL), checks whether the particular called resource is in a predetermined resource list, preferably a secure list, and, if it is in the predetermined resource list, loads that resource from an alternative location (without the knowledge of the application). If the resource is not in the predetermined resource list, then the resource simply is not loaded.

The requested resource call is checked against the resource list. If the resource is in the resource list, the rules associated with that resource are retrieved (also from the secure resource list). The translated, i.e. localized, resource itself is retrieved from a "Language Pack" or Glossary for the requested language. The resource rules are then verified with the translated resource, and, if necessary, the dialogs associated with the resource are padded to accommodate the anticipated size of the localized language dialog. The localized resource loaded is then passed to the application, or calling operating system, for processing. In this way, the application operates in its base language with selected localization taking place in accordance with the predefined resource rules.

In accordance with other aspects, the present invention relates to a system for localization, i.e. translation, of a software product that has a processor and a memory coupled with and readable by the processor. The memory contains a series of instructions that, when executed by the processor, cause the processor to load an application to an operating system wherein one of the application or the operating system places one or more calls to a resource loader to load a resource, intercept the call in the resource loader after the called resource has been retrieved to the loader, convert the resource to a language specific localized resource and transmit the localized resource to the operating system if the called resource matches one or more predetermined resource rules. If the translated resource does not match the rules, i.e. rule compliance cannot be verified, the called resource is not translated but is transmitted in its original form to the operating system via the resource loader The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
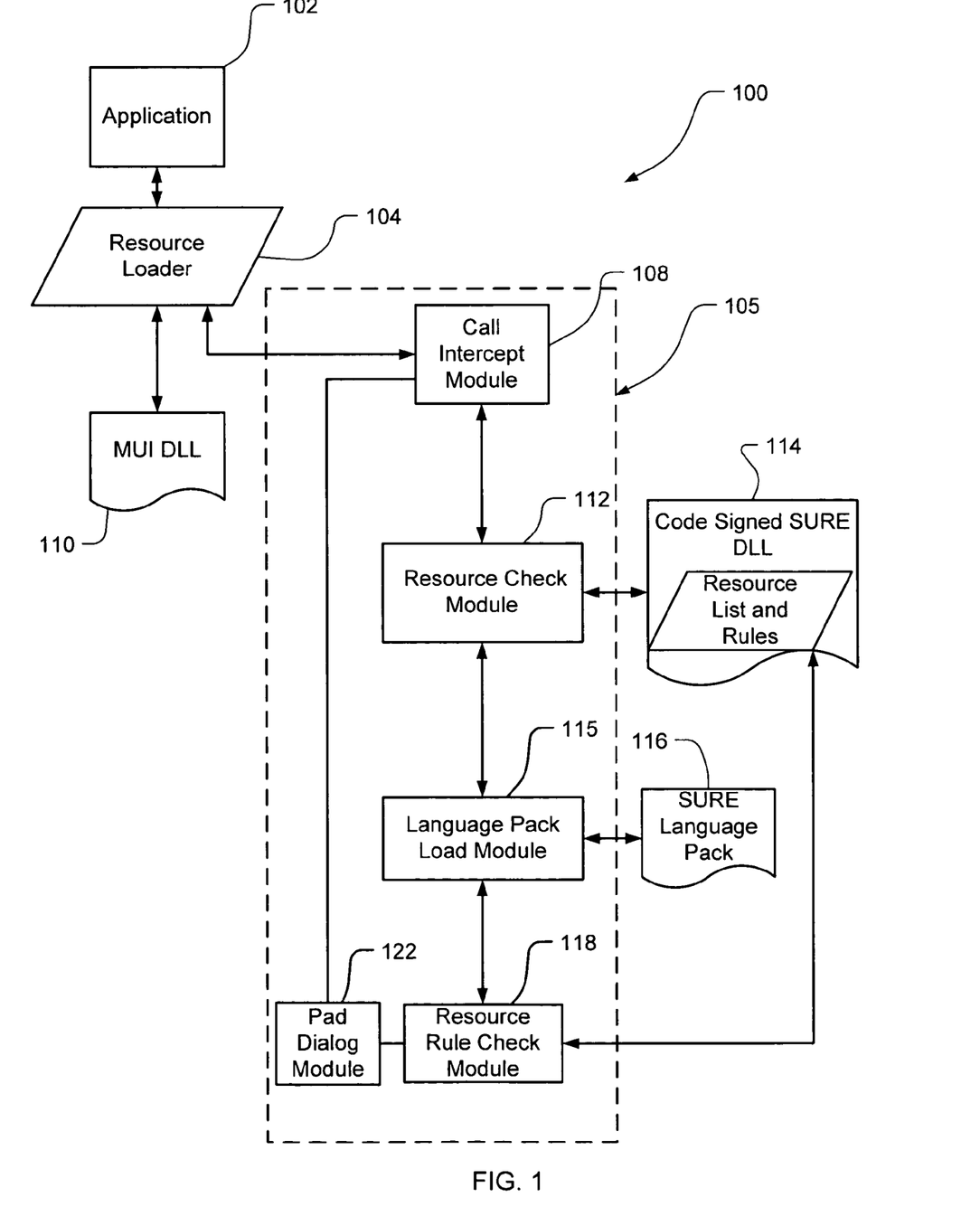
FIG. 1 illustrates, conceptually, a safe, secure localization environment according to one embodiment of the present invention.

FIG. 1 illustrates, conceptually, a secure resource (hereinafter SURE) localization system 100 according to one embodiment of the present invention. In an application such as a Microsoft® Windows operating system or Office® application, when the application 102 is loaded into the computer operating system, a call is made to a resource loader module 104. It is to be understood throughout this detailed description that the application 102 is exemplary only. The call may be made by an application, data including various data structures, Application Program Interface (API) or operating system. The resource loader module 104 checks to see what language is called for by the application 102 and goes to the appropriate language folder. From this language folder, the loader 104 retrieves the called resource preferably from a multiple language user interface dynamic link library (MUI DLL) 110. The resource called is then loaded and transferred to the operating system. The notion of storing the resources in a MUI DLL 110 is also only exemplary. The resources can be stored in any format range from files to databases (or even remote locations such as locations accessible via the internet).

However, in embodiments of the present invention, an interception of the resource is made in the resource loader 104 before transfer to the calling application.

The system 100 utilizes a SURE localization module 105 that draws from a secure code signed DLL 114 and a user developed SURE language pack 116 described in further detail below. The localization module 105 includes a call intercept module 108, a resource check module 112, a language pack load module 115, a resource rule check module 118, and a dialog pad module 122.

Intercept module 108, in embodiments of the present invention, intercepts the resource after the resource is loaded by the resource loader module 104 from the MUI DLL 110. Any of a number of known methods may be used to intercept the resource loading functions (or API's). A number of intercept methods are well known. Examples include overwriting the start of the function itself in memory, known as installing a detour, or detouring. Another exemplary method overwrites the import address table. Further examples of interception methods are described in an overview article on patching by Yariv Kaplan. One preferred method of detouring is one in which binary functions are intercepted by rewriting one or more target function images. Detouring replaces the first few instructions of the target function with an unconditional jump to a user-provided detour function and preserves the target function instructions in a trampoline function. The detour function can either replace the target function or extend its semantics by invoking the target function as a subroutine through the trampoline. The detour is preferably inserted at execution time such that the procedures in a DLL can be detoured in one execution of an application, while the original procedures are not detoured in another execution running at the same time.

Once an intercepted call is received, the call intercept module 108 communicates with the resource check 112. This module queries whether the resource transferred from the MUI DLL 110 into the resource loader module 104 has an identifier that matches one of the identifiers in code signed SURE dynamic link libraries or databases (SURE DLL's) 114. The identifiers in the code signed DLL 114 signify those resources that the application developer gives permission for a user to translate, i.e. for which authorization is given for translations to be generated. This is done by checking the resource identifier against a list inside the code signed SURE DLL 114. The code signed DLL (or database) 114 cannot be modified by a user. The code signing itself also prevents anyone from adding additional resources to the files in this library. The SURE DLL 114 contains a list of the resource identifiers for all of the resources that are authorized to be translated. For each one of these it also has a list of verification rules. This file is the same for any SURE language.

It is to be understood that throughout this specification the code signed DLL 114 is simply one type of secure data structure that can be used. Any database, file, file set, or DLL can perform this function so long as it cannot be modified in any way by an unauthorized user. Authorization is preferably limited to the originator/developer of the calling application or operating system itself. In this way, the code signed DLL 114 is predetermined and not modifiable by a third party user. If the resource has a matching resource identifier, a translation of the resource, i.e. a localized resource or translation is loaded from a SURE language pack library or glossary file 116. The Language Pack library file 116 can be anything from an XML file through to a database. Translations could come from internet services or from machine translation tools rather than physical files.

Language packs 116 contain the language specific translations and differ from one language to the next. Typically these files are created by human translators (i.e., people who will provide a list of translations for their language). A fast lookup format development or SURE build tool could also be optionally provided to speed up runtime performance. The SURE Build Tools (which could be part of a SURE Kit) take the editable format of the translations (i.e., XML or text files) and convert them to a format that can be loaded quicker at runtime (e.g., a database)—this database is what is called the Language Pack.

An example of an XML file (that a build tool would take as input) might look as follows:

```
<resNode name="Dialogs">
    <resource id="string1">
        <text>This is the text to translate</text>
        <reftext>This is reference text, such as the translation in
        another language</reftext>
        <rules>These are the verification rules. Examples:
            <maximumlength> 5</maximumlength>
        </rules>
    </resource>
</resNode>
```

Users can translate this in any simple editor (e.g., the "Notepad" accessory application included in Microsoft Windows® operating system). A more advanced editor preferably is also provided (as part of the SURE language pack creation kit) that, for example, would color-code the bits that need to be edited, and check the verification rules as the user edits.

Another kit tool preferably would convert the edited text/xml file to a faster runtime format such as an Access Database or other fast binary format (i.e., the language pack 116.)

One exemplary verification rule is Maximum Length (which could appear in the editable file as "<maximumlength>5</maximumlength>". This rule verifies that the translated resource, or string is not longer than an allowable limit. For example, if the maximum length is 5, the string "Hello" would be passed, but the string "Bonjour" would fail.

Another exemplary verification rule is a required placeholder, i.e. a case where a portion of a string must remain present. For example, a string like "Hello % s" might need to be translated. The translator would be allowed to move the "% s" portion around in the string, because it is replaced by another value at runtime (e.g. by a person's name). However, the verification rule would not allow removal of the "% s" substring. If it were removed (by the user creating a language pack, for example) then the verification would fail.

The format of the language pack databases will most likely be published so that users could write their own tools to create them independently. Note that this will not be the case for the code signed resource list files (i.e., the SURE DLL 114), where every effort is taken to protect the format and content from hacking or reverse engineering by closely controlled access authorization. Thus the code signed dynamic link library 114 is a library that cannot be modified by a user, i.e. anyone other than one authorized by the original owner/developer of the calling application or operating system.

Unlike MUI files, the language pack files do not have to be stored in a folder that is dependant on the target language. For instance, Microsoft's Office® German MUI files are stored in a "1031" folder (which happens to be the LCID or Language Code for German). In contrast, a German SURE language pack could be in "\program files\SURE\German" or "\program files\SURE\1031" or "\mymachine\mylanguages\myGerman". In other words, this can be a location chosen by the user, and the SURE tools can easily be configured to point to any location (local machine, remote server or even internet).

The language pack load module 115 receives instruction from the resource check module 112, that the called resource is matched in the SURE DLL. The language pack load module 115 then retrieves the required language pack 116. The resource string or file is checked for compliance with key restrictions and rules contained in the code signed SURE DLL 114 in the resource rule check module 118 The SURE DLL's contain both the allowable resource identifiers and a list of rules to go with each of these resource identifiers. These restrictions are preferably stored in a format that is quick to parse and validate. Modifications are made to the resource string to ensure that the base (or source) language hotkey remains in the resource. This is because translators cannot adjust hotkeys, as such adjustment would impact functionality of the underlying application and/or operating system.

If the translation loaded in the load module 115 from the language pack 116 complies with all the verification rules in the code signed SURE DLL 114 as determined in the check module 118, the translated dialogs, if any, are padded in the pad dialog module 122 as called for by the resource rules. In module 122, the sizes of controls in dialogs may need to be padded to accommodate long translated strings. If they are not padded the translated text will not fit in the available space and will be truncated or cut. The translated resources are then passed through the resource loader 104 to the calling application 102 or data structure, or, if it were the operating system itself that made the call, to the operating system.

The application 102 represents any of a wide variety of possible software products including but not limited to a word processor, spreadsheet, Internet browser, database, operating system, and others. The base application may be developed in and for a specific language. For example, a product developed in the United States may be developed in English. Alternatively, the base product may be language neutral. That is, the base product may be developed in such a manner as to have no reference in its user interface or other elements written to a specific language. The MUI DLL 110 provides full translations for multiple languages that have been fully tested and provide full functionality to the application. In other cases, the base application may be written with only minimal reference to a specific language to facilitate testing of the base product during development.

Again, the MUI DLL 110 provides the translations for a number of specific languages. In contrast, the user defined language packs and the use of a secure data store such as a code signed SURE DLL 114 permits virtually any language to be utilized in an application and accommodates thousands of languages or dialects that are non-mainstream languages. The user defined language packs require no interaction with the software developer (original application owner of application 102) to use and thus these language packs can be freely developed and disseminated via the internet and other media, without compromising the functionality of the underlying application 102.

In embodiments of the present invention, because critical resources are not translated, non-translated resources remain in the base language thus ensuring security of the underlying program. The SURE language packs are language neutral. They are just collections of glossary files that have a one to one correspondence with resources that can be translated. There is no enabling function with embodiments in accordance with the present invention. SURE functions purely as a translation layer.

Figure 2:
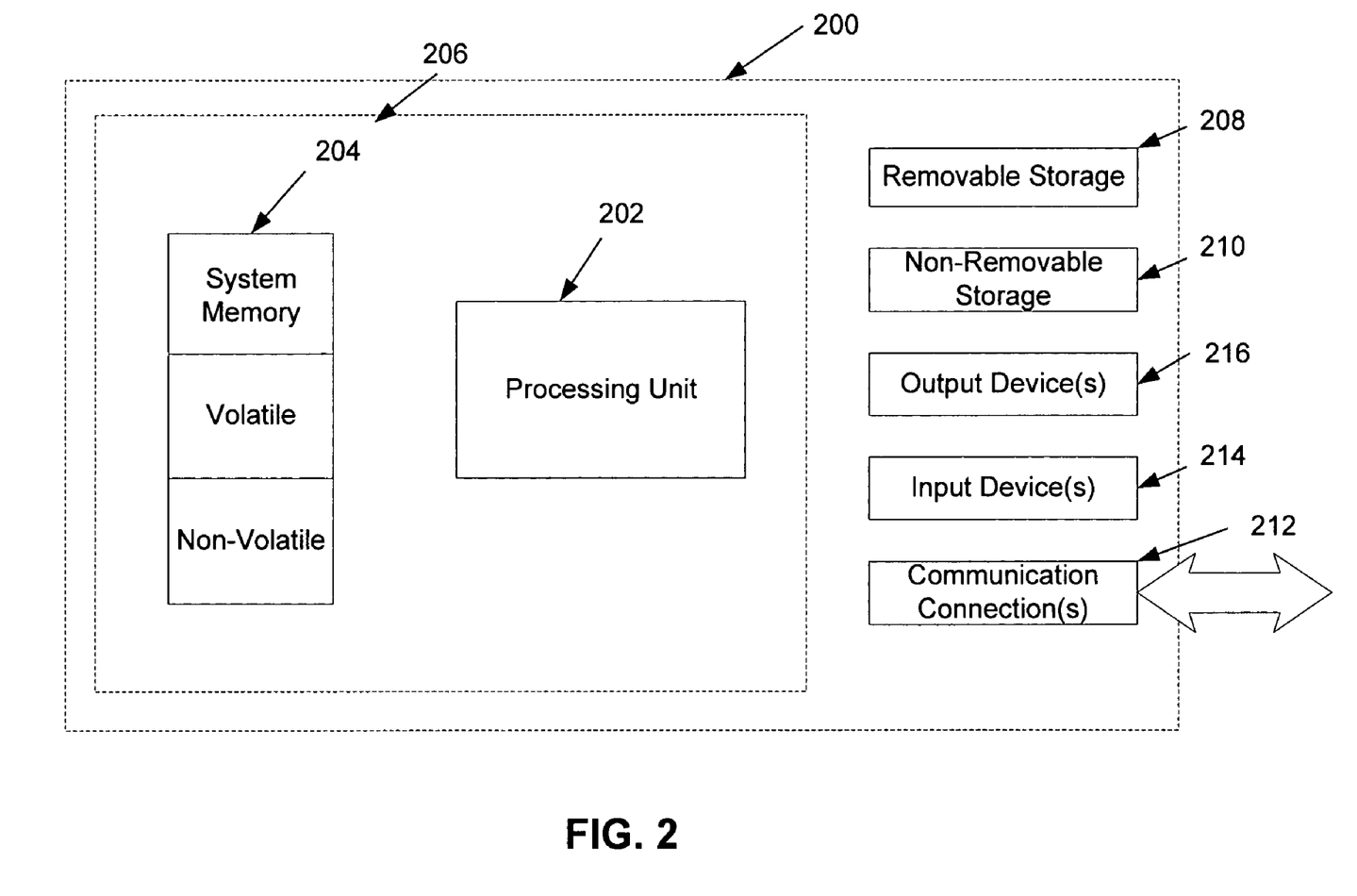
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used as a stand-alone computer or to serve as a redirector and/or servers in a website service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200.

System 200 may also contain communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
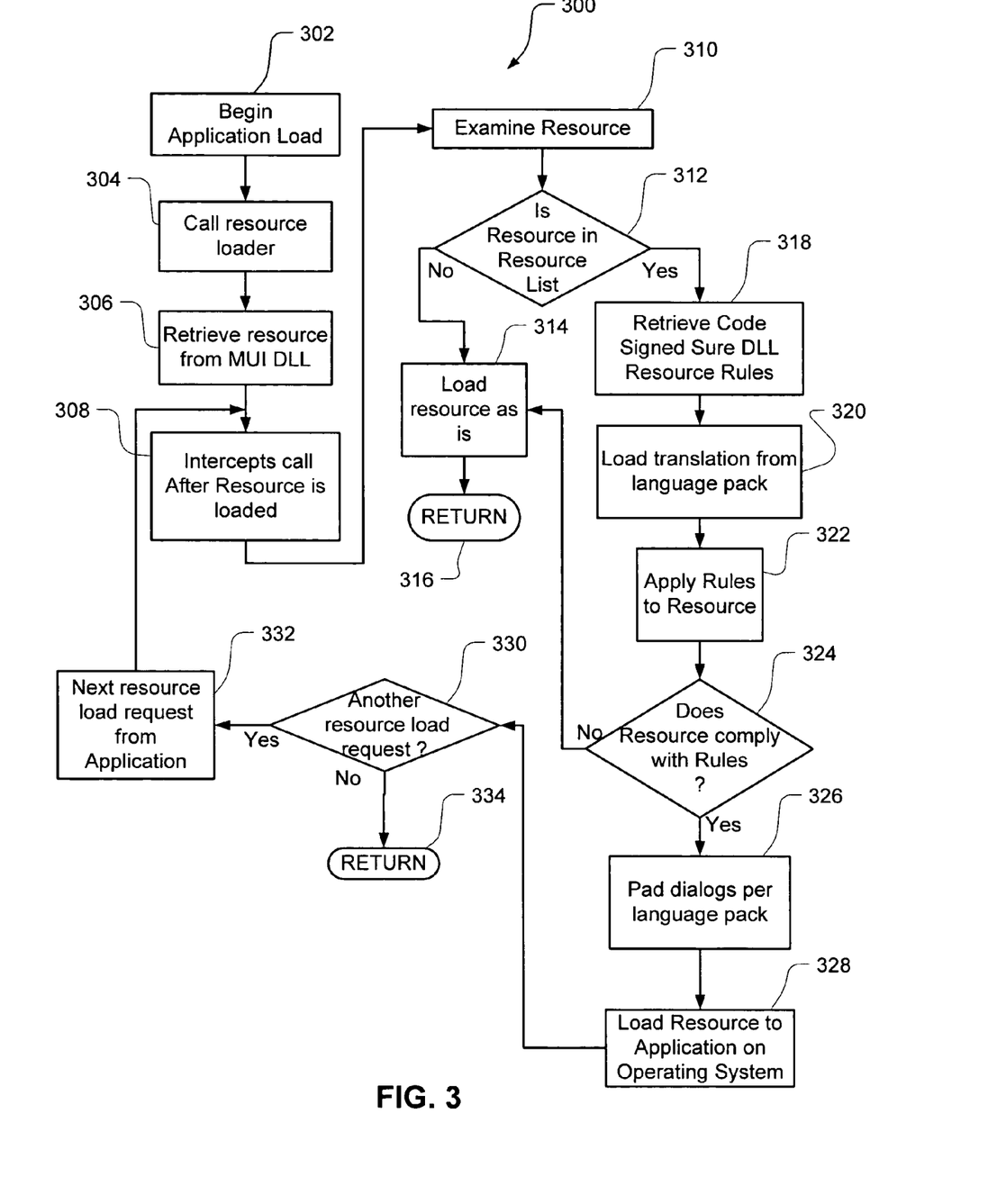
FIG. 3 is a flowchart illustrating load time operations in a software product utilizing safe, secure localization according to one embodiment of the present invention.

FIG. 3 is a flowchart illustrating operational flow 300 of the translation system and method according to one embodiment of the present invention. In this example, operation begins with application loading operation 302. In operation 302 the application load is commenced onto the operating system of the computing device 200. During this loading operation a call may be made to the resource loader 104. Control then passes to operation 304 where the application calls the resource loader. The resource loader in turn queries the MUI DLL 110 (i.e., resources). Control then transfers to operation 306.

In operation 306 the MUI DLL 110 is searched until a match is found and the called resource is identified. The called resource is retrieved and sent to the resource loader 104. Control then transfers to operation 308 where the application call is intercepted via the call intercept module 108. Control then transfers to operation 310.

Operation 310 examines the retrieved resource to obtain its identifier(s). Control then passes to query operation 312 in resource check module 112 which determine if it has an identifier that matches one of the identifiers stored in the code signed SURE DLL 114. If there is a match, then control passes to operation 318. If there is no match, then control passes to operation 314. In operation 314, the resource loaded from the MUI DLL 110 is passed to the operating system without modification in any way.

On the other hand, if there is a match, and control passes to operation 318, the code signed SURE DLL 114 is queried to retrieve all resource rules pertaining to the called resource. Control then passes to operation 320. In operation 320, a translation of the called resource is loaded in the load module 115 from the appropriate language pack 116 for the resource. This translation, i.e., the localized resource, is loaded and then compared, in check module 118, to the rules pertaining to that resource in operation 322. The applicable rules found in the SURE DLL 114 are then applied to the resource to verify that the translation complies with all applicable rules. Control then passes to query operation 324.

In query operation 324, the query is made by the check module 118, whether the localized resource complies with the applicable rules. If so, control passes to operation 328. If the resource does not comply with the applicable rules, the resource is not translated, but is passed to operation 314, where the resource is passed through the resource loader 104 to the calling application or operating system without translation. No modifications are made to the original loaded resource if the new translations fail on any of the rules. On the other hand, if the resource complies with all the applicable rules, i.e. verification is successful, then control passes to operation 326, where, in module 122, applicable translated or localized resource dialogs are padded in accordance with instructions provided by the language pack. At this stage modifications may also be made to the hotkeys where necessary. Control then passes to operation 328.

In operation 328, the localized resource has now been translated and therefore is passed or loaded back to the calling application and loaded on the operating system. Control then passes to query operation 330. Query operation 330 asks whether there are any further resource load requests in the resource loader 104. If so, control passes to operation 332 where the next resource load request is received from the calling application into the resource loader 104. If there is no further resource load request from the application or operating system, control returns to the resource loader 104 to await another request, in operation 334.

Although the invention has been described in language specific to computer structural features, methodological acts and by computer readable media, it is to be understood that the invention defined in the appended claims is not necessarily limited to the specific structures, acts or media described. As an example, other types of data may be included in the language map in place of the string data discussed herein. Additionally, different manners of referencing the language specific data of the language map from the system calls in base product may be used. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of localization of a software product comprising:
    loading an application or an operating system wherein the application or operating system places a plurality of calls to a resource loader to load a plurality of resources;
    loading one of the plurality of resources in response to a call to load the one of the plurality of resources, wherein the application or operating system indicates a language for the one of the plurality of resources;
    intercepting the one of the plurality of resources in the resource loader after the one of the plurality of resources which is in the language has been received in the resource loader;
    comparing the one of the plurality of resources to a predetermined set of resource identifiers to determine whether the one of the plurality of resources is permitted to be translated, wherein the predetermined set of resource identifiers are in a data structure that cannot be modified without prior authorization; and
    when the one of the plurality of resources is permitted to be translated, loading a translation in a different language for the one of the plurality of resources; and
    transmitting the one of the plurality of resources to the application or operating system without translation when the one of the plurality of resources is not permitted to be translated.

2. The method of claim 1, further comprising comparing the translation for the one of the plurality of resources to one or more predetermined rules and transmitting the one of the plurality of resources to the application or the operating system without translation when the called resource does not match the one or more predetermined rules.

3. The method of claim 1 wherein the data structure is stored in a code signed dynamic link library.

4. A system comprising:
a processor; and
a memory coupled with and readable by the processor and containing a series of instructions that, when executed by the processor, cause the processor to load one of an application, data or an operating system wherein the one of the application, data or operating system places a call to a resource loader to load a resource;
load the resource into the resource loader in response to the call to load the resource, wherein the one of the application, data or operating system indicates a language for the resource;
intercept the resource in the resource loader after the resource which is in the language has been received in the loader;
transmit the resource without translation to the one of the application, data or operating system if the resource is not permitted to be translated based on a comparison with one or more predetermined resource identifiers;
convert the resource to a language specific localized resource in a different language if the resource is permitted to be translated based on a comparison with the one or more predetermined resource identifiers, wherein converting the resource comprises:
comparing the resource to the predetermined set of resource identifiers in a library that cannot be modified by an unauthorized user;
if the resource matches one of the identifiers, loading a translation of the resource from a localized language pack; and
comparing the translation of the resource to one or more predetermined rules.

5. The system of claim 4 wherein the series of instructions cause the processor to transmit the translation of the resource to the one of the data, application or operating system if the translation complies with the one or more predetermined rules.

6. The system of claim 5, wherein the series of instructions cause the processor to load the resource without translation to the one of the data, application or operating system if the translation of the resource does not comply with the one or more predetermined rules.

7. The system of claim 4 wherein the library is stored in a code signed dynamic link library having a non-modifiable format.

8. A computer storage medium encoding a computer program of instructions for executing a computer process for localization, said computer process comprising:
loading one of an application, data or an operating system wherein one of the application, the data or the operating system places a call to a resource loader to load a resource;
loading the resource in response to the call to load the resource, wherein the application, data or operating system indicates a language for the resource;
intercepting the resource in the resource loader after the resource which is in the language has been received in the loader;
converting the resource to a language specific localized resource in a different language if the resource is permitted to be translated based on a comparison with one or more predetermined resource identifier, wherein the converting comprises:
comparing the resource to a predetermined set of resource identifiers in a data structure that cannot be modified by a user;
when the resource matches one of the identifiers, loading a translation of the resource from a localized language pack; and
comparing the translation of the resource to one or more predetermined rules;
transmitting the localized resource in the different language to the one of the application, data or operating system; and
transmitting the resource in the language without translation if the resource is not permitted to be translated based on a comparison with the one or more predetermined resource identifiers.

9. The computer storage medium of claim 8 wherein if the resource does not comply with the one or more predetermined rules, transmitting the resource in the language without translation to the one of the application, data or operating system.

10. The computer storage medium of claim 8 wherein the data structure is stored in a code signed dynamic link library.

* * * * *

UNITED STATES PATENT AND TRADEMARK OFFICE
CERTIFICATE OF CORRECTION

PATENT NO. : 7,552,452 B2
APPLICATION NO. : 11/040331
DATED : June 23, 2009
INVENTOR(S) : Barry McHugh et al.

It is certified that error appears in the above-identified patent and that said Letters Patent is hereby corrected as shown below:

On the title page at line 63, please delete "Continuation" and insert -- Divisional -- in place thereof Signed and Sealed this Twenty-first Day of December, 2010

David J. Kappos
*Director of the United States Patent and Trademark Office*